UNITED STATES PATENT OFFICE.

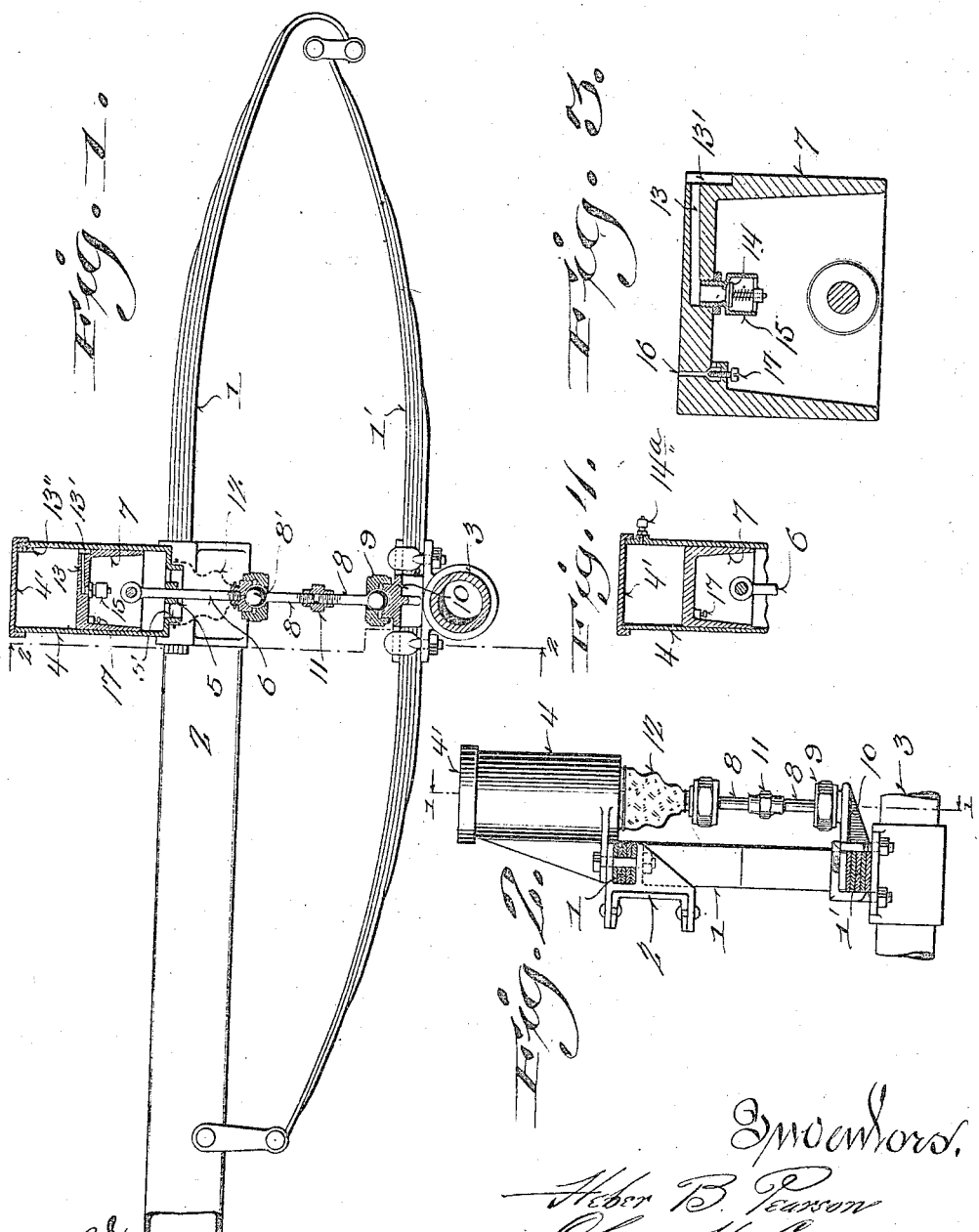

HEBER B. PEARSON, OF PORTAGE, AND GEORGE H. LANGE, OF FALL RIVER, WISCONSIN.

SHOCK-ABSORBER.

1,182,504. Specification of Letters Patent. Patented May 9, 1916.

Application filed June 19, 1915. Serial No. 35,017.

*To all whom it may concern:*

Be it known that we, HEBER B. PEARSON and GEORGE H. LANGE, both citizens of the United States, and residents of Portage, in the county of Columbia and State of Wisconsin, and of Fall River, in the county of Columbia, and State of Wisconsin, respectively, have invented certain new and useful Improvements in Shock-Absorbers; and we do hereby declare that the following is a full, clear, and exact description thereof.

Our invention has for its object to provide a simple, economical and effective shock-absorber adapted to be attached to the springs of a vehicle irrespective of the type of spring, the same being especially intended for use in connection with automobiles. The construction and arrangement of the attachment is such that when the springs are collapsed by shock an air cushion will relieve the tension upon the springs upon the down stroke and also upon the backlash or reaction of the spring, thus relieving the machine of great strain, as well as to provide comfort in riding to the occupants of the vehicle.

With the above objects in view the invention consists in certain peculiarities of construction as set forth hereinafter with reference to the accompanying drawings and subsequently claimed.

In the drawings Figure 1 represents a side elevation of a vehicle spring equipped with a shock absorber embodying the features of our invention, the section being shown indicated by line 1—1 of Fig. 2; Fig. 2, a cross-section of the springs showing an edge view of the shock absorber mechanism, the section being indicated by line 2—2 of Fig. 1; Fig. 3, an enlarged detailed sectional elevation of a piston equipped with one means for effecting the relief of air pressure in a cushioning and return stroke of the shock absorber, the said means embodying a relief valve and by-pass, which are, in this exemplification of our invention, shown in connection with a piston, and Fig. 4 is a detail fragmentary view showing a variation of the invention.

Referring by characters to the drawings, 1 represents the upper section of a spring and 1' the lower section, the said upper section being secured in any suitable manner to the side bar 2 of a truck and the lower section is shown secured to the axle 3. This mechanism, however, forms no part of our invention and it is understood that any spring either fully elliptic or semi-elliptic may be equipped with a device embodying the features of our invention.

The upper spring section and its frame beam 2 has secured thereto an air cylinder 4 having a closed head 4', the mouth of the cylinder being in spider form and is provided with a bearing hub 5 which serves as a guide for a pitman rod 6. The upper end of the pitman rod is secured to a piston head 7 and the said pitman rod has coupled thereto a pitman rod section 8, the same being connected to the pitman rod 6 by a ball and socket joint 8', as shown. The lower end of the pitman rod section is fitted in a ball and socket joint 9, the lower member of which is in the form of a bracket 10 that is secured by a suitable clip to the lower spring section 1'. In order to effect adjustment for different widths of springs and also for tension purposes, the pitman rod section 8 is interrupted by a turnbuckle coupling 11, whereby the rod section can be shortened or lengthened. In order to prevent dust or dirt entering the cylinder, the spidered end of the same is provided with a flange 5', to which is secured one end of a jacket 12 that is composed of some porous material or screen-cloth. The lower end of this jacket is secured to one member of the coupling connection 8'. Hence it will be seen that the entire mechanism can be readily attached to a spring without resorting to cutting or fitting whereby the attachment can be effected by those unskilled in the art of mechanics, the device in this instance as a whole being shown offset from the spring members, whereby it is clear of obstructions. It is manifest, however, that the cylinder in some instances may be placed between the spring sections or upon the inside of the spring sections rather than at the outside, as shown in Fig. 2.

Referring to Fig. 3 of the drawings, the piston is provided with a vent channel 13 which extends to one edge of the piston and is intersected by a lead port 13', which lead port is extended to the upper surface of the piston-head. The vent channel is fitted with an outwardly opening check-valve 14, which check-valve in this instance is shown of the spring-seating type and is incased in a housing 15 that is in threaded union with the vent channel. The head of the piston is also provided with a restricted air duct 16 which extends therethrough and the passage of air through said duct is regulated by a set-screw 17, as shown. The upper end of the cylinder adjacent to the head 4' is fitted with a closure block 13'', which block is adapted to enter the lead port 13' and cut off communication between the same and the vent channel 13 when the piston has completed the major portion of its upward stroke. By this arrangement when the spring is compressed, the piston, for the major portion of its upward stroke, will move freely without air resistance due to the fact that the air within the upper portion of the cylinder is free to escape through the valve. When the head of the piston, however, reaches a predetermined point in its upward stroke, the closing block 13'' will enter the lead port 13' and cut off communication between said channel and the cylinder chamber. Thus a partial compression of a predetermined quantity of air will be effected as the piston completes its stroke, whereby a cushion effect is produced relative to collapse of the spring members, there being a slight relief of the cushion due to the escape of a small quantity of the air through the by-pass or air duct 16. Upon the reaction of the springs after receiving the downward shock tending to collapse the same, the piston will move down quickly and in this movement the valve 14 will prevent air from entering through the vent channel 13 to the cylinder chamber. Hence a partial vacuum will result in the upper portion of the cylinder chamber which will be relieved only by the small amount of air which is permitted to enter through the duct 16 of the piston head and thus a retardation of the springs will be effected upon their recovery stroke. Hence it will be seen that shock will be taken up in both directions upon the springs, whereby the life of said springs will be materially increased and the vehicle will not be subjected to the racking strain of abrupt collapse or expansion of the spring members.

While we have shown the valve-controlled vent in connection with the piston-head, it is obvious that the vent valve, in some instances, can be placed directly into the walls of the upper portion of the cylinder, whereby the same result will attain. The restricted air passage 16 could likewise be affixed to the cylinder whereby the same results would be produced and it is therefore understood that the variations in the structural features can be changed within the knowledge of skilled mechanics without departing from the invention set forth herein and the description of minute detail showing one way of carrying out our invention only refers to the exemplification as illustrated.

In Fig. 4 a variation of the invention is suggested wherein the check valve 14ª is mounted directly in the wall of the cylinder instead of in the piston. Such an arrangement is advantageous in some instances, as the same dispenses with the use of a channel in the piston. In this form of the invention when the piston passes the check-valve in its upward movement, the said valve is cut out and the trapped air in the top of the cylinder forms a cushion for the piston.

We claim:

1. A pneumatic shock absorber comprising an air cylinder, a piston therefor, a valve-controlled vent provided with a lead port for relieving compression in the cylinder when the piston is traveling toward the head end thereof, means engaging the lead port for controlling the vent before completion of the aforesaid piston stroke, and a restricted air duct for constantly venting the head end of the cylinder independent of the valve-controlled vent.

2. In a vehicle having a frame member and a spring member, a cylinder secured to one of the members, a piston therein, a pitman rod connecting the piston and the other member, a valve-controlled vent provided with a lead port for relieving compression in the cylinder when the piston is traveling toward the head end thereof, a closure block engaging the lead port for closing the vent before completion of the aforesaid piston stroke, and a restricted air duct for venting the head end of said cylinder independent of the valve-controlled vent.

In testimony that we claim the foregoing we have hereunto set our hands at Fall River, in the county of Columbia and State of Wisconsin, in the presence of two witnesses.

HEBER B. PEARSON.
GEO. H. LANGE.

Witnesses:
F. L. SMITH,
M. A. FRECK.

Copies of this patent may be obtained for five cents each, by addressing the "Commissioner of Patents, Washington, D. C."